March 31, 1959 — O. J. POUPITCH — 2,879,569
MOULDING CLIP
Filed Sept. 23, 1954 — 2 Sheets-Sheet 1
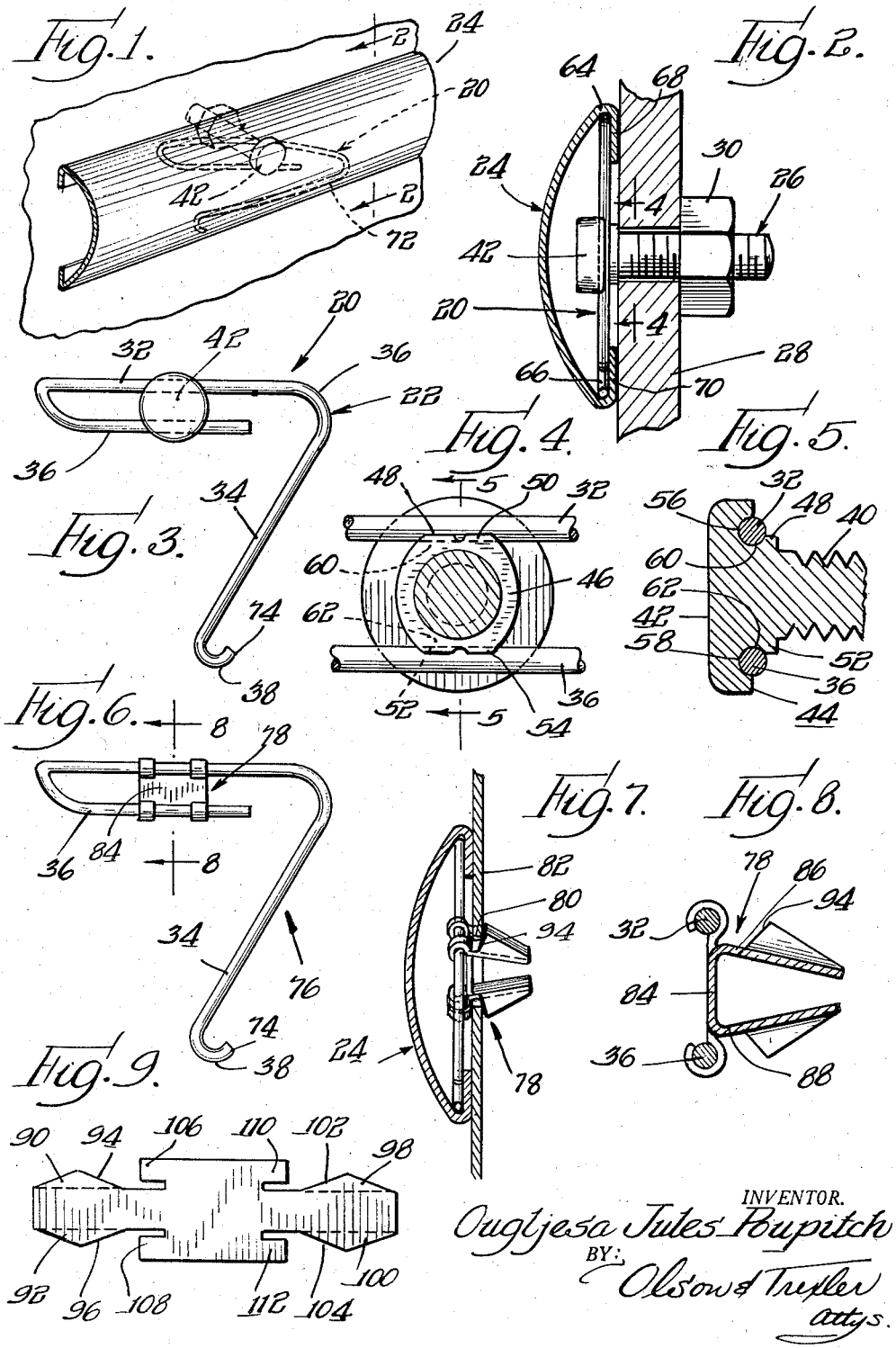
INVENTOR.
Ougljesa Jules Poupitch
BY: Olson & Trexler
attys.

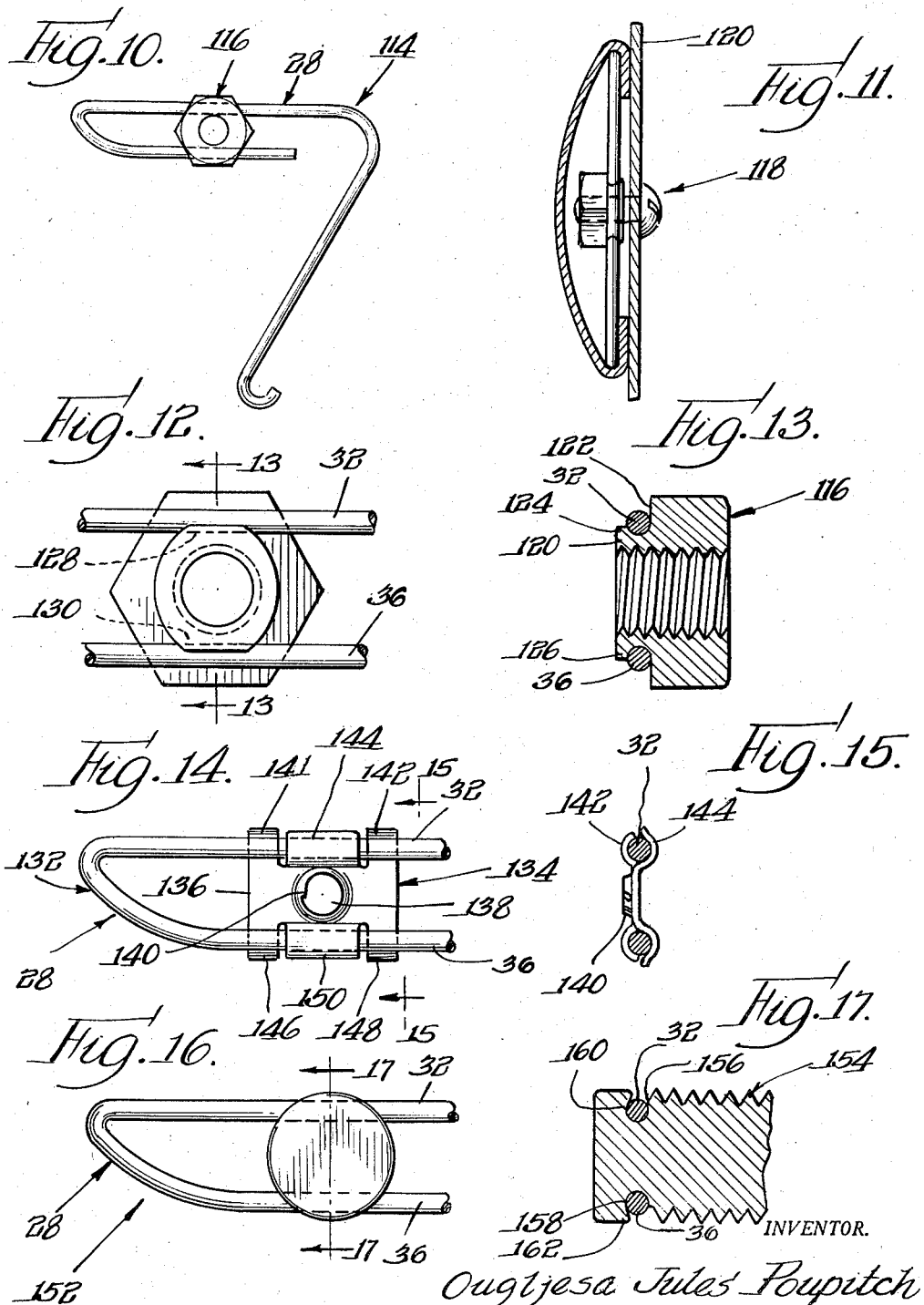

United States Patent Office 2,879,569
Patented Mar. 31, 1959

2,879,569

MOULDING CLIP

Ougljesa Jules Poupitch, Itasca, Ill., assignor to Illinois Tool Works, Chicago, Ill., a corporation of Illinois Application September 23, 1954, Serial No. 457,988

8 Claims. (Cl. 24—73)

The present invention relates to a novel fastener device or clip and more particularly, to a novel clip for mounting channel-like articles such as moulding strips to a workpiece.

As is well known, moulding strips are applied to various workpieces such as automobile panels and such moulding strips are made in a variety of sizes and often, moulding strips are tapered or otherwise formed so that their width varies along their length. An object of the present invention is to provide a novel fastening device or clip for mounting moulding strips or similar channel-shaped articles to a workpiece, which clip is of simplified construction and requires less stock material than generally similar clips heretofore proposed, and which clip is adapted to be used for mounting channel-shaped articles or moulding strips having a wide variety of widths.

A more specific object of the present invention is to provide a novel fastening device or moulding clip of the above mentioned type having a head section made from spring wire stock and formed so as to facilitate connection therewith of a securing member such as a screw, nut or snap-in type stud in a manner which will prevent relative rotation between the head section and the securing member.

Another object of the present invention is to provide a novel moulding clip of the above described type which may be easily assembled between opposite sides of a channel-shaped article such as a moulding strip and which is engageable with the sides of the article in a manner so as to be securely retained in proper assembled relationship.

Other objects and advantages of the present invention will become apparent from the following description and the accompanying drawings wherein.

Fig. 1 is a perspective view illustrating a novel fastener device or moulding clip embodying the principles of this invention and assembled with a moulding strip and an apertured workpiece or panel;

Fig. 2 is an enlarged cross sectional view taken along line 2—2 in Fig. 1;

Fig. 3 is a plan view of the moulding clip shown in Fig. 1;

Fig. 4 is an enlarged fragmentary cross sectional view of the novel moulding clip taken along line 4—4 in Fig. 2;

Fig. 5 is a fragmentary cross sectional view taken along line 5—5 in Fig. 4;

Fig. 6 is a plan view showing a moulding clip embodying a modified form of the present invention;

Fig. 7 is a cross sectional view showing the moulding clip of Fig. 6 assembled with a moulding strip and an apertured panel;

Fig. 8 is an enlarged cross sectional view taken along line 8—8 in Fig. 6;

Fig. 9 is a plan view of a metal blank for the securing member or stud of the clip shown in Figs. 6 through 8;

Fig. 10 is a plan view of another modified form of the present invention;

Fig. 11 is a cross sectional view showing the novel moulding clip of Fig. 10 assembled with a moulding strip and a workpiece;

Fig. 12 is an enlarged fragmentary bottom end view of the moulding clip shown in Fig. 10;

Fig. 13 is a cross sectional view taken along line 13—13 in Fig. 12;

Fig. 14 is a fragmentary plan view showing another modified form of the present invention;

Fig. 15 is a cross sectional view taken along line 15—15 in Fig. 14;

Fig. 16 is a fragmentary plan view showing still another modified form of the present invention; and Fig. 17 is a fragmentary cross sectional view taken along line 17—17 in Fig. 16.

Referring now more specifically to the drawings wherein like parts are designated by the same numerals throughout the various figures, a fastening device or moulding clip 20 embodying the principles of this invention is shown in Figs. 1 through 5. The clip 20 includes a head section 22 adapted to engage and retain a suitable channel-shape article such as a moulding strip 24, and a securing member or screw 26 adapted to extend through an aperture in a workpiece or panel 28 and cooperate with a nut 30 for securing the clip to the workpiece.

In accordance with the present invention, the head section 22 is made from a length of spring wire stock which is bent to provide a pair of angularly disposed leg portions 32 and 34 joined by a curved hinge section 36. The outer end of the leg portion 32 emerges with a reversely bent portion 36 which extends along the leg portion 32 in substantially parallel spaced relationship, and the outer end of the leg portion 34 terminates in a short reversely bent section 38 for a purpose described fully below.

The screw member 26 includes a threaded shank 40 and an enlarged head 42 having clamping face 44. The shank 40 is adapted to be inserted between the portions 32 and 36 of the wire head section until the clamping face engages these portions. In order to positively retain the screw member and the wire head section in assembled relationship, the screw member is provided with shoulder means 46 between the head and the shank, which shoulder means is staked or otherwise deformed as at 48, 50, 52 and 54 over the portions 32 and 36. If desired, parallel grooves 56 and 58 may be provided in the clamping face of the screw member head for partially receiving the wire portions 32 and 36, which portions are securely retained in the grooves by the staked or deformed parts of the shoulder means. It should be noted that the shoulder means is provided with parallel surfaces 60 and 62, which parallel surfaces in combination with the grooves engage the wire portions extending on opposite sides of the screw member shank and positively prevent relative rotation between the screw member and the wire head section.

As shown in Figs. 1 and 2, the generally V-shaped wire head section is adapted to be snapped within the channel-shape moulding strip 24 for engaging opposite sides 64 and 66 of the moulding strip and for overlying inturned flanges 68 and 70 of the moulding strip and thereby securely retain the moulding strip. The leg portion 34 of the wire head section is adapted to extend along the side 66 of the moulding strip so that a portion thereof adjacent the curved hinge section 36 bears against the moulding strip as indicated at 72 in Fig. 1. At the same time the outwardly flared end section 38 engages the moulding strip so that the leg portion 34 is flexed and placed under a stressed condition. The stresses in the leg 34 supplements the action of the resilient hinge section 36 in urging the outer end of the leg portion 32 which traverses the moulding strip into engagement with the side 64 of the moulding strip. Thus, the wire head section firmly engages the opposite sides of the moulding strip to retain the strip in position. Furthermore, the free terminal edge 74 of the outwardly flared end section 38 is adapted to bite into the moulding strip to restrain the strip against longitudinal shifting relative to the clip. It will be appreciated that the resilient wire head section is adapted to be assembled within moulding strips having a wide variety of widths. Furthermore, since the leg portion 32 and its cooperating reversely bent portion 36 act as a relatively rigid structure which extends transversely of the moulding strip and since the securing member or screw is fixed at approximately the mid-portion of this structure, the screw will always be positioned at approximately a point midway between the sides of the moulding strip regardless of the relative positions of the leg portions 32 and 34. In other words, the screw member will always be positioned substantially midway between the sides of the moulding strip when the strip is relatively wide and the leg portions 32 and 34 are collapsed only slightly toward each other as well as when the moulding strip is relatively narrow and the leg portions 32 and 34 are collapsed substantially toward each other.

In Figs. 6 through 9 there is shown a fastening device or moulding clip 76 which embodies a modified form of the present invention. This moulding clip includes a spring wire head section which is identical to the above described wire head section as indicated by the application of identical reference numerals added to corresponding elements. This embodiment differs in that the above described screw member has been replaced by a sheet metal snap-in type securing member or stud member 78 adapted to be inserted through an aperture 80 in a workpiece or panel 82.

The stud member 80, which is preferably made from sheet metal, includes a head portion 84 and a pair of leg portions 86 and 88 extending generally axially from the head portion and converging toward each other. A pair of wing members 90 and 92 extend outwardly from opposite margins of the leg portion 86 and are arranged substantially perpendicular to the leg portion to provide shoulder or abutment surfaces 94 and 96 for engaging the rear surface of the workpiece or panel. The leg portion 88 is provided with similar wings 98 and 100 having shoulder or abutment surfaces 102 and 104. With this structure it is seen that as the legs of the stud member 78 are inserted through the panel aperture, the wings serve to cam the legs toward each other until the abutment surfaces pass beneath the panel whereupon the leg portions spring outwardly to position the abutment surfaces beneath the panel.

In order to securely connect the stud member 78 to the wire head section, pairs of finger portions 106—108 and 110—112 extend from opposite margins of the stud member head portion 84. The head portion 84 is of such a size that it will extend between the portions 32 and 36 of the wire head section and the finger portions 106 through 112 are formed around these wire portions to connect the stud member and the head section. It will be appreciated that the clip of Figs. 6 through 9 will be especially useful for application to workpieces or panels which are disposed so that it would be inconvenient or impossible to position a nut or the like behind the panel for application to a screw member such as that shown in the embodiments of Figs. 1 through 5.

In certain installations it may be desirable to mount the clip member on an apertured workpiece or panel by means of a screw member extending outwardly of the panel from the back side thereof, and in such instances the clip member 114 shown in Figs. 10 through 13 is particularly useful. The clip member 114 includes a wire head section identical to the wire head sections described above. In place of the screw member 26 or the sheet metal stud member 78, the securing member of this embodiment is in the form of a nut 116. The nut 116 is adapted to cooperate with a screw or the like 118 which extends outwardly through the workpiece or panel 120 as shown in Fig. 11. As shown best in Figs. 12 and 13, the nut member 116 may be of any conventional form except that it is provided with an annular shoulder or abutment 120 extending axially from its clamping face 122, which annular shoulder is disposed between the wire portions 32 and 36 and staked or otherwise deformed over these portions as indicated at 124 and 126 for retaining the nut member and the wire head section in assembled relationship. It should be noted that the annular shoulder 120 is provided with parallel surfaces 128 and 130 that engage the wire portions 32 and 36 to prevent the nut member from rotating relative to the wire head section.

In Figs. 14 and 15 there is shown a clip member 132 which has a wire head section identical to the above described wire head sections so that only a portion thereof need be shown. This embodiment differs from the embodiment shown in Figs. 10 through 13 in that the solid nut member 116 has been replaced by a sheet metal nut member 134. The nut member 134 includes a body portion 136 having a central aperture 138 therein, which aperture is defined by a helically formed inner marginal portion 140 of the body member to provide a complementary screw accommodating helical thread. In order to secure the nut member 134 to the wire head section portions 32 and 36, the nut member is provided with finger portions 141 and 142 underlying and partially formed around the wire portion 32 and a larger finger portion 144 overlying and partially wrapped around the wire portion 32. The nut member is similarly connected to the wire portion 36 by means of finger elements 146 and 148 corresponding to the finger elements 141 and 142 and a larger finger element 150 corresponding to the finger element 144. It will be appreciated that with this construction, substantial manufacturing economies may be affected while at the same time the clip member will have sufficient holding power for many installations.

Figs. 16 and 17 show a clip member 152 which is similar to the clip member shown in Figs. 1 through 5 except that it is provided with a modified screw 154. The screw 154 is in the form of a substantially headless stud and is provided with parallel grooves 156 and 158 in opposite sides adapted to receive the wire portions 32 and 36 to connect the stud and the wire head section and to prevent relative rotation between the stud and the wire head section. Preferably, end portions 160 and 162 of the stud adjacent the groove are deformed or staked after the wire portions have been assembled within the grooves to insure against accidental disassembly and to prevent the stud from sliding longitudinally of the wire portions.

From the above description, it is seen that the present invention has provided a novel clip member fully capable of satisfying the objects heretofore set forth. More specifically, it is seen that the present invention has provided a clip member having a simple and economical wire head section to which various securing members such as screws, nuts, and snap-in type sheet metal studs may be easily secured in a manner which will prevent relative rotation between the wire head section and the securing member. Furthermore, it is seen that the present invention has provided a novel clip member capable of use for retaining, in a secure manner, channel-shaped articles such as moulding strips having a wide variety of widths.

While the preferred embodiments of the present invention have been shown and described herein, it is obvious that many structural details may be changed without departing from the spirit and scope of the appended claims.

The invention is claimed as follows:

1. A fastener device for mounting channel-shaped articles to a workpiece comprising a one-piece resilient wire head section including a pair of diverging leg portions respectively for engaging opposite sides of the article, one of said leg portions merging with a reversely bent portion extending along said one leg portion, said one leg portion and said reversely bent portion including substantially parallel sections and a securing member fixed between said substantially parallel sections for securing said fastener device in assembled relationship with a workpiece, article engageable ends of said pair of leg portions being disposed substantially in a common plane traversing the axis of said fastener device, said securing member including means providing substantially parallel surfaces at opposite sides thereof engaging said substantially parallel sections for restraining relative rotation between said head section and said securing member, and said securing member including portions engaging and retaining said sections against lateral relative movement away from each other.

2. A fastener device, as defined in claim 1, wherein said reversely bent portion extends from an end of and is shorter than said one leg portion and is disposed between said leg portions, and wherein the other of said leg portions includes a short reversely bent end portion flared away therefrom and from said one leg portion for engaging said article and properly positioning said head section within said article.

3. A fastener device, as defined in claim 1, wherein said securing member includes a screw member disposed between and staked to said one leg portion and said reversely bent portion.

4. A fastener device, as defined in claim 1, wherein said securing member includes nut means having a portion thereof disposed between and staked to said one leg portion and said reversely bent portion.

5. A fastener device, as defined in claim 1, wherein said securing member is a sheet material stud including a head portion having parts thereof at least partially receiving and retaining said one leg portion and said reversely bent portion for connecting said sheet material stud to the wire head section, a pair of resilient legs extending generally axially from said head portion for insertion through an aperture in a workpiece, and abutment means extending laterally outwardly from each of said stud legs for engaging the workpiece.

6. A fastener device, as defined in claim 1, wherein said securing member is a sheet material nut having an apertured body portion disposed between said one leg and said reversely bent portion, which aperture is defined by a helical thread-forming edge, and finger means extending from opposite margins of said body portion and respectively adapted to grip said one leg portion and said reversely bent portion for securing the nut to the wire head section.

7. A fastener device, as defined in claim 8, wherein said last mentioned portions of said securing member include means providing surfaces parallel to and at least partially enveloping and engaging opposite sides of said straight sections for preventing relative rotation between said head section and said securing member.

8. A fastener device for mounting channel-shaped articles and the like to a workpiece comprising a one-piece resilient wire head section including a pair of diverging leg portions respectively presenting ends for engaging opposite sides of the article, said leg portions having adjacent ends integrally joined to each other, one of said leg portions having an end opposite from the junction with the other of said leg portions integrally joined to a reversely bent portion disposed along said one leg portion, said one leg portion and said reversely bent portion including adjacent substantially straight sections, and a securing member fixed between said substantially straight sections for securing said fastener device in assembled relationship with a workpiece, said securing member including means providing substantially straight surface means engaging at least one of said straight sections for restraining relative rotation between said securing member and said straight sections, said securing member including portions engaging and retaining said straight sections against relative lateral movement away from each other, and said article engageable ends of said leg portions being disposed substantially in a common plane traversing the axis of said securing member.

References Cited in the file of this patent
UNITED STATES PATENTS

| | | |
|---|---|---|
| 890,285 | Krantz | June 9, 1908 |
| 1,222,453 | Otte | Apr. 10, 1917 |
| 1,873,881 | Hall | Aug. 23, 1932 |
| 2,133,366 | Van Uum | Oct. 18, 1938 |
| 2,144,910 | Churchill | Jan. 24, 1939 |
| 2,159,573 | Tinnerman | May 23, 1939 |
| 2,178,719 | Cotter | Nov. 7, 1939 |
| 2,218,832 | Schroeder | Oct. 2, 1940 |
| 2,254,310 | Place | Sept. 2, 1941 |
| 2,267,379 | Tinnerman | Dec. 23, 1941 |
| 2,383,133 | Kost | Aug. 21, 1945 |
| 2,515,895 | Poupitch | July 18, 1950 |
| 2,709,286 | Bedford | May 31, 1955 |